Jan. 4, 1944.   C. S. ASH   2,338,224
DUAL WHEEL ASSEMBLY
Original Filed May 20, 1939   2 Sheets-Sheet 1

INVENTOR
Charles S. Ash,
Morgan Finnegan
ATTORNEYS.

Jan. 4, 1944.  C. S. ASH  2,338,224
DUAL WHEEL ASSEMBLY
Original Filed May 20, 1939  2 Sheets-Sheet 2

INVENTOR:
Charles S. Ash
ATTORNEYS.

Patented Jan. 4, 1944

2,338,224

UNITED STATES PATENT OFFICE 2,338,224

DUAL WHEEL ASSEMBLY

Charles S. Ash, Milford, Mich.

Original application May 20, 1939, Serial No. 274,669. Divided and this application February 4, 1942, Serial No. 429,475

7 Claims. (Cl. 280—96.1)

The invention relates to new and useful improvements in dirigible differential wheel assemblies, and more particularly to such improvements in dirigible differential wheel assemblies whereby camber is imparted or permitted to the wheels. This application is a division of my copending application Ser. No. 274,669, filed May 20, 1939, now Patent #2,274,353, issued Feb. 24, 1942.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate one embodiment of the invention, and together with the description, serve to explain the principles of the invention.

Figure 1:
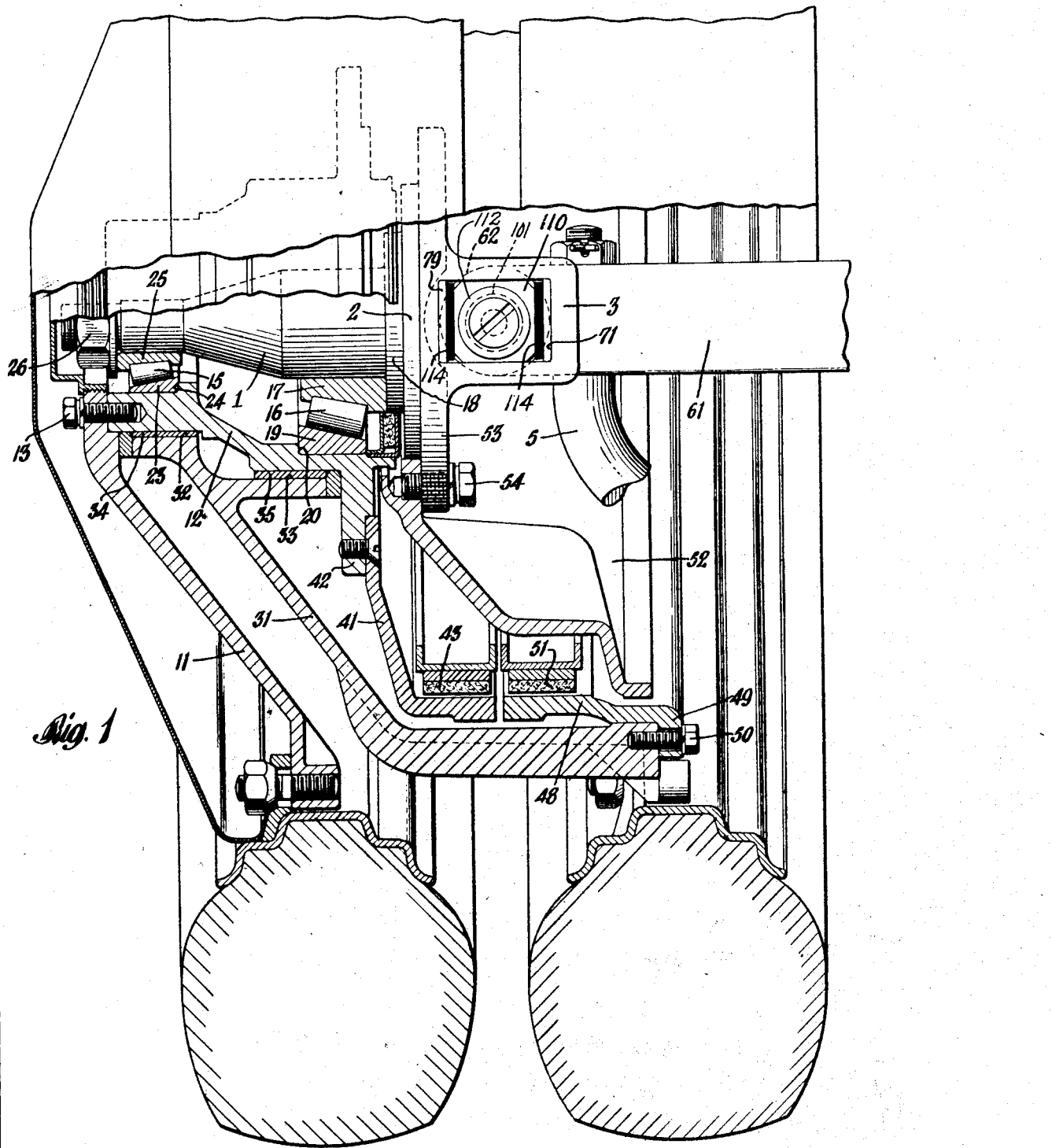
Fig. 1 is a partial horizontal plan and section through a left-hand dual wheel assembly embodying the invention.

The object of the present invention is to provide for or effect a limited or desired amount of camber in dirigible differential front wheel assemblies. A further object is to provide means in such wheel assemblies for automatically effecting the camber to a desired or predetermined degree. Still a further object is to provide camber permitting or camber effecting mechanism in connection with the king pin mounting of the steering knuckle on the axle beam in such wheel assemblies. Another object of the invention is to provide for automatically effecting camber to conform to variations in the road bed so as to impose equal load and wear on both wheels.

With these and other objects in view there is provided, as a present preferred embodiment, dirigible differential front wheels, freely relatively rotatable on an integral spindle and yoked steering knuckle which have rotative movement relatively to the end of the front axle bar about an interposed king pin, the knuckle and spindle being angularly movable about the king pin axis by the steering gear.

To automatically effect desired camber the steering knuckle is so mounted upon the axle bar by means of the king pin that the spindle may have limited vertical angular movement relatively to the axle bar about a horizontal axis, and this axis is a pivotal support of the knuckle upon the king pin. The relative movement of the spindle in a vertical plane is in planes varying with the steering movement of the knuckle and spindle. The spindle is resiliently held to a normal position but has limited angular movement from that position in a vertical plane, and by the cambering action thus obtained the side-by-side tires are allowed to conform to the road bed and thereby uniform action is obtained as to loading wear, traction, steering, while the wheels are freely rotatable with respect to each other.

It will be understood that the foregoing general description and the following detailed description as well are exemplary and explanatory of the invention but are not restrictive thereof.

Referring now to the embodiment of the invention illustrated by way of example in the accompanying drawings, a wheel spindle 1 has integral therewith a yoked knuckle having a body portion 2 and horizontally-extending arms 3 and 4, there being a connection 5 between the lower arm and the steering mechanism which may be of usual form.

The embodied form of side-by-side differential wheels rotatably mounted on the spindle 1 comprises an outboard wheel having a dished web 11 fastened to the flat outer face of a hub 12 by screw bolts 13, the hub 12 encircling the spindle 1. Between the hub 12 and the spindle 1 are two spaced-apart inclined roller bearings 15 and 16, which may be of suitable or known form. The inner ring 17 of inner bearing 16 abuts on its inner face on a flange or shoulder 18 integral with spindle 1 and the outer face of the outer ring 19 abuts on a shoulder 20 formed in hub 12. The outer ring 23 of outer bearing 15 abuts at its inner face on a shoulder 24 on hub 12, and the outer face of inner ring 25 of this bearing abuts on a nut 26 screw-threaded on the end of spindle 1. The inboard wheel comprises a dished web 31 integral with which is a dished offset hub, having two cylindrical bearing surfaces 32 and 33, which are journaled on corresponding cylindrical surfaces on the exterior of hub 12 with suitable interposed bushings 34 and 35. Braking means are provided for each wheel, the outboard wheel having a brake drum 41 which is bolted to a flange 42, integral with and extending outwardly from the inner end of the inner wheel hub 12, and an expansible brake shoe 43 is mounted within the drum 41 and is provided with suitable actuating means. The inboard wheel has a brake drum 48 having an integral, outwardly-extending annular lip 49 abutting on the inner flat annular face of wheel 31 and fastened thereto by screw bolts 50. Drum 48 likewise has an expansible brake shoe 51 operated by suitable means. A dished protecting shield 52 for the brake mechanism is provided, which is centrally internally apertured, and adjacent to said aperture is fastened to and supported from a disc 53 integral with wheel spindle 1 by screw bolts 54.

Figure 2:
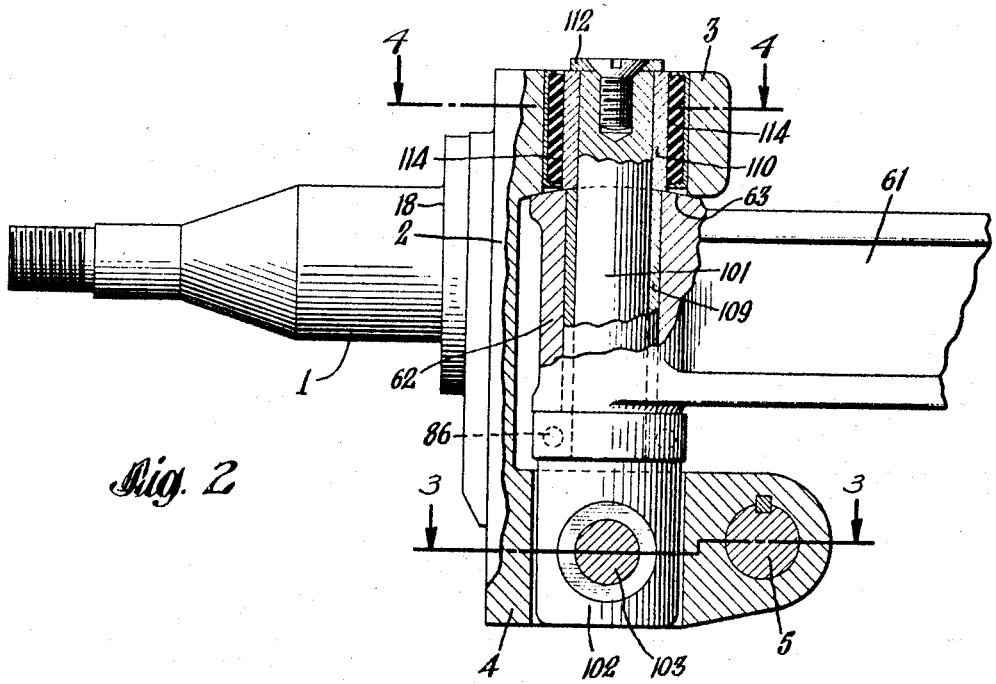
Fig. 2 is an enlarged fragmentary detail elevation with parts in section of the steering knuckle and wheel spindle and end of the axle beam of Fig. 1.

In the embodiment of the invention shown in the accompanying drawings a pivotal joint is provided between the steering knuckle and axle beam end for effecting relative rotary movement between them whereby automatic cambering may be effected concurrently with the usual steering control. As shown in Fig. 2, an axle beam 61 has an enlarged end 62 fitting within the spaced apart arms 3 and 4 of the steering knuckle, the end 62 having a convex spherical top bearing surface 63 upon which rests the cooperatingly concave bearing surface 64 of the steering knuckle arm 3. The other or lower portion of the enlarged axle end 62 is mounted for relative rotary movement upon the enlarged flat sided base 102 of king pin 101, a ball bearing 86 being interposed between the members for easier steering of the vehicle. The king pin 101 extends through a substantially vertical cylindrical bore in the end 62 of the axle beam 61, with a bushing 109 interposed between its surface and that of the axle end.

Figure 3:
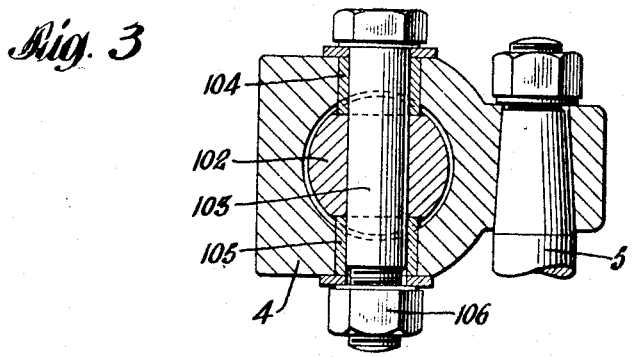
Fig. 3 is a section taken along line 3—3 of Fig. 2.
Figure 4:
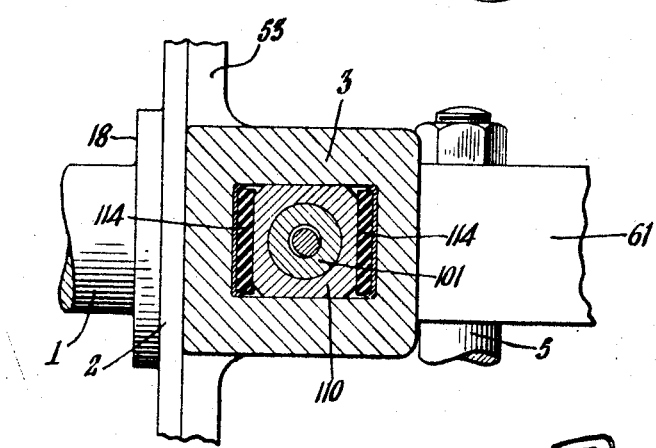
Fig. 4 is a section taken along line 4—4 of Fig. 2.

As may be seen in Fig. 3, the enlarged flat-sided base 102 of king pin 101 is located within a cylindrical opening in the lower arm 4 of the steering knuckle with considerable space left to allow for the relative movement of the parts. The base 102 is pivotally supported on bolt 103 which projects through flanged bushings 104 and 105 seated in openings formed at either side in the knuckle arm 4, the bolt being held in place by a nut 106.

In order to resiliently mount the upper knuckle arm 3 upon the axle end 62 the king pin 101 extends upwardly through a cylindrical bore in a rectangular block 110 which is positioned in a vertical rectangular opening in the knuckle arm 3. The block 110 has a concavely spherical lower surface which rests on the spherical top surface 63 of axle end 62. The dimensions of block 110 are such that a fairly close fit results between the sides of the block and knuckle arm 3 laterally of the axis of the axle and spindle, while considerable space is left between the block and the steering knuckle arm longitudinally of the axis of the axle and spindle. In this space at either end of the block 110 are positioned resilient pads 114 which are held in place by metal casings 115.

With the construction of dirigible differential wheel assembly shown and described it will be apparent that the integral spindle 1 and steering knuckle 2 are capable of vertical angular movement relatively to the axle beam 61 about the horizontal axis of the pivotal supporting bolt 103, and that this movement is resiliently limited by the interposition of pads 114 in the path of movement. Automatic cambering of the wheels is thereby effected and the side-by-side tires are allowed to conform to the road surface and equal loading of the tires is realized. The automatic cambering is effected whatever the horizontal angular relation may be between the spindle 1 and the axle beam 61 due to steering the vehicle.

It will be understood that my automatically cambering dirigible differential wheel assembly may be adapted to all types of front axle beam and steering knuckle structures. The pivoting axis may be arranged at the bottom portion of the knuckle as shown herein or may be reversed and located at the top portion of the knuckle; and by raising or lowering the pivoting axis for the camber action the amount of compensation for the two tires at the road bed is effected.

The invention in its broader aspects is not limited to the specific mechanisms shown and described but departures may be made therefrom within the scope of the accompanying claims without departing from the principles of the invention and without sacrificing its chief advantages.

What I claim is:

1. A dual dirigible front wheel assembly including in combination a wheel spindle and yoked steering knuckle, dual wheels mounted on said spindle, an axle beam with its end within said steering knuckle yoke, a king pin connecting said knuckle and axle beam, a pivotal support for the king pin mounted in one arm of the knuckle yoke, means permitting limited angular movement of the king pin within the other arm of the knuckle yoke and connections for moving the spindle and knuckle about the axis of the king pin to effect steering.

2. A dual dirigible front wheel assembly including in combination an axle beam, a wheel spindle having dual wheels mounted thereon, said wheels being rotatable on the spindle independently of each other, a king pin for pivotally connecting the spindle to the axle beam and forming a substantially vertical axis about which the spindle and wheels can turn for steering movement, and a second pivotal mounting for the spindle and wheels about which they can turn together on a substantially horizontal axis to impart camber to said dual wheels, said horizontal axis intersecting the king pin axis between the ends of said king pin.

3. A dual dirigible front wheel assembly including in combination an axle beam, a wheel spindle having dual wheels mounted thereon, said wheels being rotatable on the spindle independently of each other, a king pin between the two wheels for pivotally connecting the spindle to the axle beam and forming a substantially vertical axis about which the spindle and wheels can turn for steering movement, and a second pivotal mounting for the spindle and wheels about which they can turn together on a substantially horizontal axis to impart camber to said dual wheels said horizontal axis intersecting the king pin axis between the ends of said king pin.

4. In a dual dirigible front wheel assembly the combination of a pair of wheels, wheel mounting means on which said wheels are mounted for coaxial side-by-side rotation, mounting means on the vehicle on which the wheel mounting means are mounted, and yoke and king pin members interconnecting said means whereby said means are relatively movable about a substantially vertical axis for vehicle steering, the king pin member at one extremity thereof being pivotally connected to the yoke member and at the other extremity thereof having resilient engagement with said yoke member.

5. In a dual dirigible wheel assembly the combination of a spindle, a pair of wheels mounted on the spindle for coaxial side-by-side rotation, an axle end, means for mounting the spindle on the axle end for relative movement between the spindle and axle end about a substantially vertical axis and a substantially horizontal axis, said means including a yoke member and a king pin member and means at one end of the king pin member pivotally connecting said member to the yoke member, and means at the other end of the king pin member for resiliently associating the king pin member and the yoke member.

6. In a dual dirigible wheel assembly the combination of a spindle, a pair of wheels mounted on the spindle for coaxial side-by-side rotation, an axle end, a yoke and king pin connection between the spindle and axle end for relative rotary movement between said members about a substantially vertical axis for steering the vehicle, and means in said connection allowing automatic cambering of the wheels including a pivotal joint interconnecting one end of the king pin and the yoke and resilient bushings at the other end of the king pin between the king pin and the yoke.

7. In a dirigible wheel assembly the combination of a spindle, a wheel rotatably mounted on the spindle, a yoke fixed to the spindle, an axle end positioned between the arms of the yoke, a king pin substantially vertically journaled in the axle end and extending into a relatively large aperture in each of the arms of the yoke, a shaft journaled in one yoke arm passing through the aperture and having the king pin journaled thereon, and removable bushings between the other yoke arm and the king pin in the aperture.

CHARLES S. ASH.